US012365633B2

(12) United States Patent
Roach et al.

(10) Patent No.: US 12,365,633 B2
(45) Date of Patent: Jul. 22, 2025

(54) METHOD TO TIE COMPOSITE VANE PLATFORM AND AIRFOIL DESIGN DETAILS

(71) Applicant: RTX Corporation, Farmington, CT (US)

(72) Inventors: James T. Roach, Vernon, CT (US); Jenkins V. Cruz, San Diego, CA (US); Addison Williams, Escondido, CA (US); Daniel Ip, Carlsbad, CA (US); Rutva A. Patel, Middletown, CT (US); Jonathan L. Chin, Cary, NC (US); Brian Cronin, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/534,154

(22) Filed: Dec. 8, 2023

(65) Prior Publication Data
US 2025/0187990 A1      Jun. 12, 2025

(51) Int. Cl.
  *F01D 5/28*      (2006.01)
  *C04B 35/628*   (2006.01)
  *C04B 35/634*   (2006.01)
  *C04B 35/80*    (2006.01)

(52) U.S. Cl.
  CPC ........ *C04B 35/80* (2013.01); *C04B 35/62886* (2013.01); *C04B 35/634* (2013.01); *F01D 5/282* (2013.01); *C04B 2235/5244* (2013.01); *C04B 2235/5256* (2013.01); *C04B 2235/616* (2013.01); *F05D 2230/30* (2013.01); *F05D 2300/6033* (2013.01)

(58) Field of Classification Search
  CPC ............................... F01D 5/282; C04B 35/80
  See application file for complete search history.

(56) References Cited

U.S. PATENT DOCUMENTS

| | | | |
|---|---|---|---|
| 10,408,084 B2 * | 9/2019 | Thomas | F01D 9/065 |
| 10,724,387 B2 * | 7/2020 | Farrar | F01D 5/282 |
| 11,162,377 B2 | 11/2021 | Shinavski et al. | |
| 11,415,013 B1 | 8/2022 | Whittle et al. | |
| 11,434,177 B2 | 9/2022 | Razzell et al. | |
| 2020/0392049 A1 | 12/2020 | Razzell et al. | |
| 2021/0156266 A1 * | 5/2021 | Farrar | F01D 5/282 |

FOREIGN PATENT DOCUMENTS

| | | |
|---|---|---|
| EP | 3064715 A1 | 9/2016 |
| EP | 4283095 A1 | 11/2023 |

OTHER PUBLICATIONS

Extended European Search Report for EP Application No. 24216579.3, dated May 20, 2025, 8 pages,.

* cited by examiner

Primary Examiner — Michael L Sehn
(74) *Attorney, Agent, or Firm* — Kinney & Lange, P.A.

(57) ABSTRACT

A method of forming a ceramic matrix composite (CMC) vane including an inner diameter platform, an outer diameter platform, and an airfoil extending between the inner diameter platform and the outer diameter platform includes laying up a ceramic preform by arranging at least one core formed from a first ceramic material, and laying up, over the at least one ceramic core, a plurality of contoured plies, each of the plurality of contoured plies formed from a second ceramic material. Each of the plurality of contoured plies partially forms the inner diameter platform, the outer diameter platform, and the airfoil of the vane. The method further includes densifying the ceramic preform with a matrix.

16 Claims, 3 Drawing Sheets

METHOD TO TIE COMPOSITE VANE PLATFORM AND AIRFOIL DESIGN DETAILS

BACKGROUND

The present disclosure relates generally to composite architectures and more particularly to ceramic matrix composite structures in gas turbine engines.

Ceramic matrix composites are desirable for use in gas turbine engines due to their unique material properties including high temperature and oxidation resistance capabilities, high strength and creep resistance, high thermal conductivity, and low weight. Certain composite components, such as turbine engine components, can include complex curvatures and/or other features for which conventional layup techniques result in distortions and reduced fiber regions in the preform. Reducing these defects prior to matrix formation helps facilitate uniform density of the final component, which is critical to its performance, durability, and function.

SUMMARY

A method of forming a ceramic matrix composite (CMC) vane including an inner diameter platform, an outer diameter platform, and an airfoil extending between the inner diameter platform and the outer diameter platform includes laying up a ceramic preform by arranging at least one core formed from a first ceramic material, and laying up, over the at least one ceramic core, a plurality of contoured plies, each of the plurality of contoured plies formed from a second ceramic material. Each of the plurality of contoured plies partially forms the inner diameter platform, the outer diameter platform, and the airfoil of the vane. The method further includes densifying the ceramic preform with a matrix.

A fibrous vane preform includes an inner diameter platform, an outer diameter platform, an airfoil extending between the inner diameter platform and the outer diameter platform, at least one core disposed within the airfoil, and a plurality of contoured plies laid up over the at least one ceramic core, each of the plurality of contoured plies partially defining the inner diameter platform, the outer diameter platform, and the airfoil.

Figure 1:
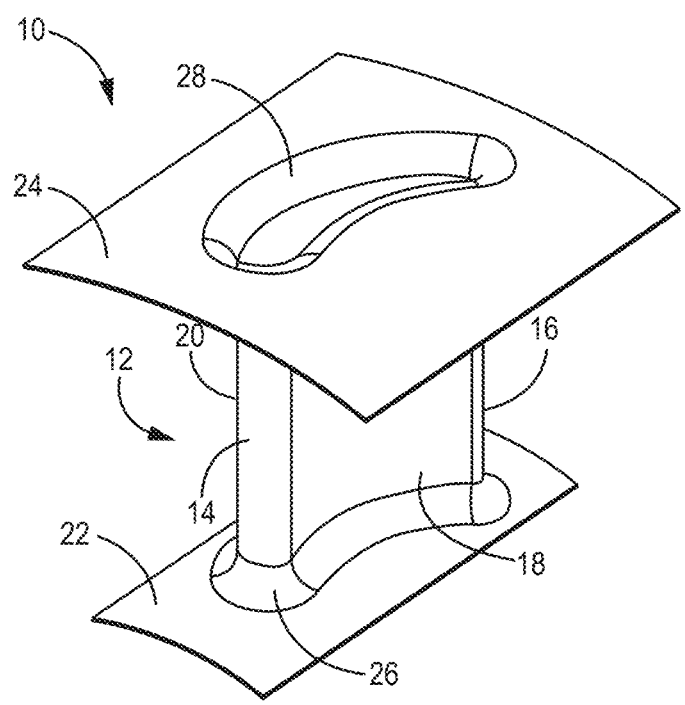
FIG. 1 is a perspective view of a vane for a gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a turbine vane manufactured from a fibrous ceramic preform including a combination of braided fabrics and continuous contoured fabrics to achieve various preferential fiber architectures throughout the vane while minimizing localized fiber distortion.

FIG. 1 is a perspective view of ceramic matrix composite (CMC) vane 10 for a gas turbine engine. Vane 10 includes airfoil 12 having leading edge 14, trailing edge 16, pressure side 18, and suction side 20. Trailing edge 16 is oppositely disposed from leading edge 14, and suction side 20 is oppositely disposed from pressure side 18. Vane 10 further includes inner diameter (ID) platform 22 and oppositely disposed outer diameter (OD) platform 24. ID fillet 26 provides an aerodynamic transition between airfoil 12 and ID platform 22, and OD fillet 28 provides an aerodynamic transition between airfoil 12 and OD platform 24. Vane 10 can be formed from various ceramic fabrics, as is discussed in greater detail below. In an exemplary embodiment, the fabrics can include fibers of silicon carbide or other suitable ceramic material. The fibers can be reinforced with a matrix material, such as silicon carbide.

Figure 2:
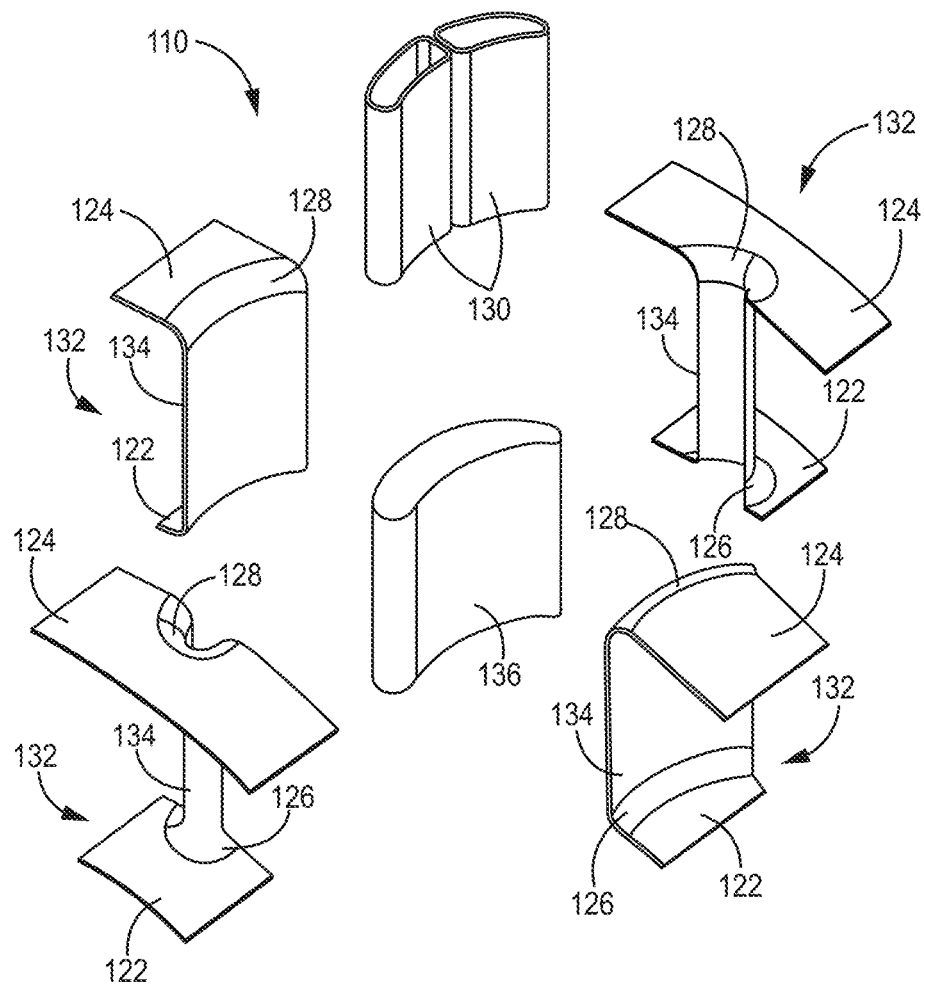
FIG. 2 is an exploded view of a vane preform.
Figure 3:
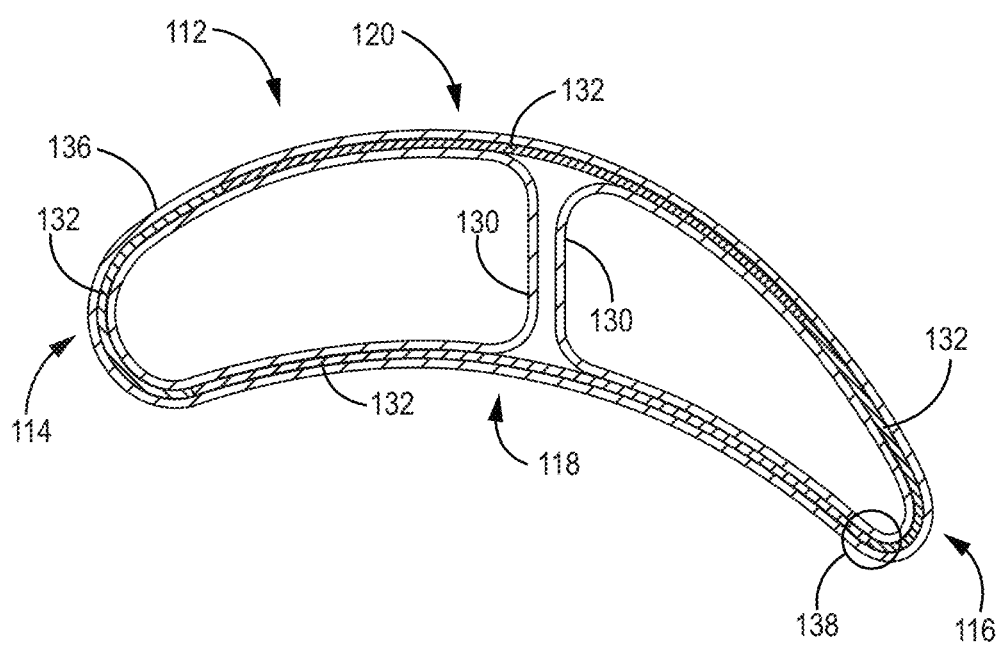
FIG. 3 is a simplified cross-sectional illustration of an airfoil of the vane preform.

FIG. 2 is an exploded view of vane preform 110, which is substantially similar to vane 10, as discussed above, but in a processing state prior to densification with a matrix. FIG. 3 is a cross-sectional view of airfoil 112 of preform 110. FIGS. 2 and 3 are discussed together.

Preform 110 includes cores 130 coextensive with airfoil 112 and defining cavities therein. Although two cores 130 are shown, alternative embodiments can include a single core 130, or more than two cores 130. Laid up around cores 130 are platform-containing plies 132. More specifically, each ply 132 includes an airfoil portion 134 generally coextensive with cores 130, an ID platform portion 122, an OD platform portion 124, an ID fillet portion 126, and an OD fillet portion 128. As such, when laid up around cores 130, each of plies 132 will at least partially form multiple regions of the final component, for example, airfoil 12, ID platform 22, OD platform 24, ID fillet 26 and OD fillet 28 of vane 10. One or more overwraps 136 can be wrapped around plies 132 and cores 130. Overwrap 136 can be the outermost layer of airfoil 112. As shown, each of four plies 132 defines a different region of airfoil 112, and more specifically, one of each primarily defining leading edge 114, trailing edge 116, pressure side 118, and suction side 120 (each labeled in FIG. 3), with some crossover into adjacent regions. Alternative embodiments may require fewer plies 132 (e.g., two or three) or more than four plies 132 (e.g., five, six, seven, eight, etc.) to cover the same four regions of airfoil 112.

Cores 130 can be braided fabrics in an exemplary embodiment and, more specifically, ceramic fabrics with a bi- or triaxial braided architecture. Each core 130 can be formed using a suitable braiding technique and a suitably shaped mandrel. Overwrap 136 can similarly be a bi- or triaxial braided ceramic fabric in an exemplary embodiment. Braided architectures for cores 130 and overwrap 136 are preferred because the fiber orientations are well-suited to withstand stresses exerted on an airfoil (e.g., airfoil 12). In some embodiments, however, cores 130 and/or overwrap 136 can be formed of non-braided architectures (e.g., knits, weaves, etc.).

Each ply 132 can be a two-dimensionally woven ceramic fabric, such as an 8-harness satin weave, in an exemplary embodiment. Other satin weaves (3, 5, 10-harness, etc.), as well as plain and twill weaves, and uniaxial architectures are contemplated herein. Alternatively, a bi- or triaxial braided material can be cut and used. Each ply 132 can be formed on a weaving apparatus suitable for producing a shaped/contoured fabric which transitions from an airfoil portion 134 to ID and OD platform portions 122, 124. The continuous nature (i.e., without requiring joints) of the fabric from ID platform portion 122 to OD platform 124, inclusive of fillet portions 126 and 128 and airfoil portion 134 is advantageous for load transfer between the ID and OD platforms of the final component (e.g., vane 10). Thus, plies 132 provide a layer of preform 110 with no axial (i.e., relative to a rotational axis of the gas turbine engine) breaks in the fabric, in particular along airfoil portions 134 and ID and OD fillet portions 126, 128 of preform 110. When trying to achieve similar continuity using braided fabrics (e.g., cores 130 or overwrap 136), fiber distortions beginning at the fillet portions has been observed. Such distortions include fiber (e.g., bias fiber) misalignment, bunching, and/or bridging. The fiber structure becomes more distorted as the fabric transitions to the ID/OD platform portion. Thus, the fabrication of preform 110 incorporates ties together the platforms and transition regions with more manipulable ceramic materials with the desired braided architecture within the airfoil.

Preform 110 can be fabricated first by arranging cores 130 in the desired orientation. Plies 132 can then be laid up over cores 130. Plies 132 can be laid up in such manner that a radially-extending joint 138 (FIG. 3) exists between adjacent plies 132. Joint 138 can be a butt joint or an overlapping joint, and further can include stitches to stabilize plies 132 during layup. One or more overwraps 136 can then be laid up over plies 132 and cores 130. A tackifier composition of a polymer material in solution (e.g., polyvinyl alcohol in water, polyvinyl butyral in ethanol, etc.) can be applied to any of the fabrics, as needed, to facilitate handling and stabilization of preform 110 through subsequent processing. Additional ceramic materials, such as inserts (i.e., "noodles") can be incorporated, as necessary into preform 110.

Preform 110 can then be optionally debulked before densification with the matrix to form the final CMC component. Densification can be carried out using chemical vapor infiltration (CVI). Other densification techniques are contemplated herein, such as one or a combination of slurry infiltration, melt infiltration, and polymer infiltration and pyrolysis. Such techniques can supplement the CVI process. Protective coatings for the CMC component (e.g., thermal barrier coatings, environmental barrier coatings, etc.) can optionally be applied after densification. The resulting CMC component can have a predominantly continuous and relatively smooth gas path surfaces free of discontinuities.

DISCUSSION OF POSSIBLE EMBODIMENTS

The following are non-exclusive descriptions of possible embodiments of the present invention.

A method of forming a ceramic matrix composite (CMC) vane including an inner diameter platform, an outer diameter platform, and an airfoil extending between the inner diameter platform and the outer diameter platform includes laying up a ceramic preform by arranging at least one core formed from a first ceramic material, and laying up, over the at least one ceramic core, a plurality of contoured plies, each of the plurality of contoured plies formed from a second ceramic material. Each of the plurality of contoured plies partially forms the inner diameter platform, the outer diameter platform, and the airfoil of the vane. The method further includes densifying the ceramic preform with a matrix.

The method of the preceding paragraph can optionally include, additionally and/or alternatively, any one or more of the following features, configurations and/or additional steps:

The above method can further include, after laying up the plurality of contoured plies, overwrapping the plurality of contoured plies with at least one overwrap layer formed from a third ceramic material.

In any of the above methods, the first ceramic material can have a multiaxial braided architecture.

In any of the above methods, the second ceramic material can have a two-dimensional woven architecture.

In any of the above methods, the two-dimensional woven architecture can be a harness satin architecture.

In any of the above methods, the third ceramic material can be the same as the first ceramic material.

In any of the above methods, the at least one core can include a first core and a second core.

In any of the above methods, each of the plurality of contoured plies can further partially form an inner diameter fillet and an outer diameter fillet of the vane.

In any of the above methods, each of the plurality of contoured plies can be laid up such that a radially-extending joint forms between adjacent ones of the plurality of contoured plies.

In any of the above methods, laying up the ceramic preform can further include applying a tackifier composition to at least one of the at least one core, the plurality of contoured plies, and the overwrap layer.

In any of the above methods, the tackifier composition can include a polymer material in a solution.

In any of the above methods, densifying the ceramic preform with a matrix can be carried out by at least one of chemical vapor infiltration, slurry infiltration, melt infiltration, and polymer infiltration and pyrolysis.

A fibrous vane preform includes an inner diameter platform, an outer diameter platform, an airfoil extending between the inner diameter platform and the outer diameter platform, at least one core disposed within the airfoil, and a plurality of contoured plies laid up over the at least one ceramic core, each of the plurality of contoured plies partially defining the inner diameter platform, the outer diameter platform, and the airfoil.

The preform of the preceding paragraph can optionally include, additionally and/or alternatively, any one or more of the following features, configurations and/or additional components:

The above preform can further include an overwrap layer paid up over the plurality of contoured plies, the overwrap layer coextensive with the airfoil.

In any of the above preforms, the at least one core can be formed from a first ceramic material, the plurality of contoured plies can be formed from a second ceramic material, and the overwrap layer can be formed from a third ceramic material.

In any of the above preforms, the first ceramic material can have a multiaxial braided architecture.

In any of the above preforms, the second ceramic material can have a two-dimensional woven architecture.

In any of the above preforms, the two-dimensional woven architecture can be a harness satin architecture.

In any of the above preforms, the third ceramic material can be the same as the first ceramic material.

In any of the above preforms, each of the first ceramic material, the second ceramic material, and the third ceramic material can include silicon carbide.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a ceramic matrix composite (CMC) vane comprising an inner diameter platform, an outer diameter platform, and an airfoil extending between the inner diameter platform and the outer diameter platform, the airfoil having a leading edge, a trailing edge, and opposing sidewalls connecting the leading edge and trailing edge, the method comprising:
   laying up a ceramic preform by:
      arranging at least one core formed from a first ceramic material; and
      laying up, over the at least one ceramic core, a plurality of contoured plies, each of the plurality of contoured plies formed from a second ceramic material, the second ceramic material having a two-dimensional woven or braided architecture,
      wherein the plurality of contoured plies define a plurality of separate vane segments, the plurality of separate vane segments including one or more leading edge segments, one or more trailing edge segments, and a plurality of sidewall segments, each vane segment including a portion of the inner diameter platform, the outer diameter platform, and the airfoil of the vane, and
      wherein each of the plurality of contoured plies is laid up such that a radially-extending joint forms between adjacent ones of the plurality of contoured plies and thereby adjacent ones of the plurality of vane segments; and
   densifying the ceramic preform with a matrix.

2. The method of claim 1 and further comprising: after laying up the plurality of contoured plies, overwrapping the plurality of contoured plies with at least one overwrap layer formed from a third ceramic material.

3. The method of claim 2, wherein the first ceramic material has a multiaxial braided architecture.

4. The method of claim 2, wherein the at least one core comprises a first core and a second core.

5. The method of claim 2, wherein each of the plurality of contoured plies further partially forms an inner diameter fillet and an outer diameter fillet of the vane.

6. The method of claim 2, wherein laying up the ceramic preform further comprises: applying a tackifier composition to at least one of the at least one core, the plurality of contoured plies, and the overwrap layer.

7. The method of claim 6, wherein the tackifier composition comprises a polymer material in a solution.

8. The method of claim 2, wherein densifying the ceramic preform with a matrix is carried out by at least one of chemical vapor infiltration, slurry infiltration, melt infiltration, and polymer infiltration and pyrolysis.

9. The method of claim 1, wherein the second ceramic material has a two-dimensional woven architecture.

10. The method of claim 1, wherein the two-dimensional woven architecture is a harness satin architecture.

11. The method of claim 1, wherein the third ceramic material is the same as the first ceramic material.

12. The method of claim 1 and further comprising forming the plurality of contoured plies on a weaving apparatus configured to produce a contoured fabric defining a shape of the plurality of vane segments.

13. The method of claim 1, wherein the joint is a butt joint.

14. The method of claim 1, wherein the joint is an overlap joint.

15. The method of claim 1 and further comprising stitching the adjacent ones of the plurality of contoured plies to adjoin and stabilize the adjacent ones of the plurality of contoured plies.

16. The method of claim 1, wherein, together, the plurality of contoured plies cover a full surface of the airfoil, the inner diameter platform, and the outer diameter platform.

* * * * *